United States Patent [19]

Snider et al.

[11] Patent Number: 4,783,592

[45] Date of Patent: Nov. 8, 1988

[54] REAL TIME ADAPTIVE ROUND DISCRIMINATION FIRE SENSOR

[75] Inventors: Danny G. Snider, Channel Islands; Robert J. Cinzori, Santa Barbara, both of Calif.

[73] Assignee: Santa Barbara Research Center, Goleta, Calif.

[21] Appl. No.: 115,948

[22] Filed: Nov. 2, 1987

[51] Int. Cl.[4] .......................... G08B 17/12; G01J 1/00

[52] U.S. Cl. .................................... 250/342; 340/578; 340/587

[58] Field of Search ........................ 250/339, 340, 342; 340/578, 587

[56] References Cited

U.S. PATENT DOCUMENTS

| | | | |
|---|---|---|---|
| 3,825,754 | 7/1974 | Cinzori et al. | 250/339 |
| 4,101,767 | 7/1978 | Lennington et al. | 250/339 |
| 4,421,984 | 12/1983 | Farquhar et al. | 250/339 |
| 4,679,156 | 7/1987 | Kern et al. | 340/578 |

*Primary Examiner*—Carolyn E. Fields

*Attorney, Agent, or Firm*—W. C. Schubert; V. G. Laslo; A. W. Karambelas

[57] ABSTRACT

A fire detection system discriminates between a HEAT round that does not initiate a secondary fire and a HEAT round which does initiate a secondary fire. The system of the invention measures the peck intensity of a penetrating HEAT round in order to determine a secondary threshold level which is subsequently utilized to detect a resulting hydrocarbon fire. Also, the system performs a statistical analysis of the slope of the round thermal signature to determine if a secondary fire may be occurring.

21 Claims, 5 Drawing Sheets

REAL TIME ADAPTIVE ROUND DISCRIMINATION FIRE SENSOR

FIELD OF THE INVENTION

This invention relates generally to fire and explosion detection and suppression systems and, more particularly, to a real time system which provides for the adaptive discrimination of a high energy anti-tank round.

BACKGROUND

Fire detection and suppression systems that are capable of responding to the presence of either a flame or an explosion for generating an output control signal used for the activation of a fire suppressant are generally known. In military applications it is often desireable to discriminate between the thermal energy generated by a hydrocarbon fire resulting from, for example, the explosion of a fuel tank in a vehicle such as an armored personal carrier or a tank and the thermal energy generated by a "High Energy Anti-Tank" (HEAT) round. HEAT rounds can cause momentary high-energy radiation levels and high temperatures which may exceed 5000° K. Such a high energy output may be due not only to the ammunition round itself but also due to a secondary reaction with the vehicle's armor. This secondary reaction has been theorized as a pyrophoric reaction. HEAT rounds may or may not, however, set off a hydrocarbon fire, depending upon whether or not the round penetrates a fuel cell and ignites the fuel therein. Thus, it is desireable to prevent the activation of a fire suppressant system when a HEAT round penetrates the armor plate of a vehicle but does not explode the fuel tank and hence, does not initiate a secondary hydrocarbon fire.

U.S. Pat. No. 3,825,754 issued July 23, 1974 to Cinzori discloses a detecting system which includes sensing means for specifically detecting a HEAT round and responding to the detection of such a round to deactivate a hydrocarbon fire detecting means for a period of time. Although well suited for many applications, this system requires external coding for various armor types. This system also requires preset primary and secondary threshold levels, does not take into consideration the thickness of the armor upon the vehicle within which the system is incorporated, does not make an allowance for the size or energy of an entering round and, the dynamic range of the round detector is generally not sufficient to measure the high intensity peaks associated with some HEAT rounds. This inability to measure some high intensity peaks may result in the detecting circuit becoming saturated by the high energy associated with the round and, thus, require that the fire sensor system be disabled for some interval of time before the circuit is enabled to detect the presence of a secondary fire.

U.S. Pat. No. 4,101,767 issued on July 18, 1978 to Lennington teaches a discrimination fire sensor which includes detecting means which discriminate between hydrocarbon fires and high-energy exploding rounds of ammunition that do not cause a hydrocarbon fire. The disadvantages inherent in this system are several. For example, the system will not readily discriminate on low energy rounds with a color temperature below 2400° K. and the system will not readily discriminate if a round has penetrated a greater thickness of armor which results in the round having a color temperature of less than 2400° K. Also, the dynamic range of the round detector is insufficient to measure the high intensity associated with many rounds which further results in the saturation of the circuit and thus requires that the sensor system be disabled for several milliseconds before the circuit can detect a secondary fire.

SUMMARY OF THE INVENTION

The foregoing problems of the prior art are overcome and other advantages are realized by a fire detection system which, in accordance with the apparatus and method of the invention, discriminates between a HEAT round that does not initiate a secondary fire and a HEAT round which does initiate a secondary fire. The system of the invention is unique in that it measures the peak intensity of a penetrating HEAT round in order to determine a secondary threshold level which is subsequently utilized to detect a resulting hydrocarbon fire. Also, the system performs a statistical analysis of the slope of the round thermal signature to determine if a secondary fire is occurring.

In accordance with the invention, the system discriminates between HEAT rounds that do not result in a fuel fire and HEAT rounds which do result in such a fire, irregardless of the type of round or the type of armor used on the vehicle. That is, the system does not require calibration or adjustment for the different types of armor plate used on vehicles or for the thickness of the armor plate. Also, the system of the invention advantageously determines in a real-time manner a secondary threshold level which is utilized to determine if a secondary fire has resulted from the round. Thus, the invention may be advantageously employed for discriminating between HEAT rounds of various size and energy levels. The invention employs a wide dynamic range, logarithmic nonsaturating detector circuit resulting in the elimination of any requirement to inhibit the fire sensor for a predetermined period of time. Thus, the problem of the prior systems which require the inhibition of the fire sensor for several milliseconds after the saturation of the round detector circuit is overcome.

The use of the fire detection system of the present invention is effective for all types of armor and for various thicknesses of armor independent of the size or energy level of the HEAT round. This feature allows the use of one system on all types of vehicles without any external adjustment being required to accommodate the specific type of armor employed upon the vehicle.

In accordance with a preferred embodiment of the invention, the round discrimination fire sensor system comprises a log detector circuit coupled to an analog-to-digital convertor which converts the detector output voltage signal into digital form. The digital output signal is processed by a microprocessor, the microprocessor having an output for controlling a switching means coupled between a fire sensor and a fire suppressant system activated by the fire sensor. Various software routines are executed by the microprocessor for monitoring the output of the detector and controlling the switching means. Upon the output signal of the detector exceeding a given primary threshold value the microprocessor is enabled to initiate a timer. Subsequently, the $dV/dT$ of the round signal is calculated and compared against a given maximum value. If this maximum value is exceeded the microprocessor will inhibit the output of the fire sensor, the threshold being exceeded typically when a HEAT round enters a vehicle without penetrating a fuel cell. If the HEAT round does penetrate a fuel cell, the rise time of the dV/dT of the round signal will generally not have exceeded the primary threshold value and the fire sensor output is not inhibited.

In accordance with the invention, the microprocessor is further operable to sample the round signal at given intervals and perform a statistical analysis of the signal by calculating the mean and the mean of the prior 16 residuals of the round signal. The mean of the residuals is utilized to determine the slope and the polarity of the slope of the round signal in order to enable the detection of a secondary fire.

BRIEF DESCRIPTION OF THE DRAWINGS

These and other valuable features of the invention will become apparent in the following description of a preferred embodiment taken in conjunction with the accompanying drawings wherein.

DETAILED DESCRIPTION OF THE INVENTION

Figure 1:
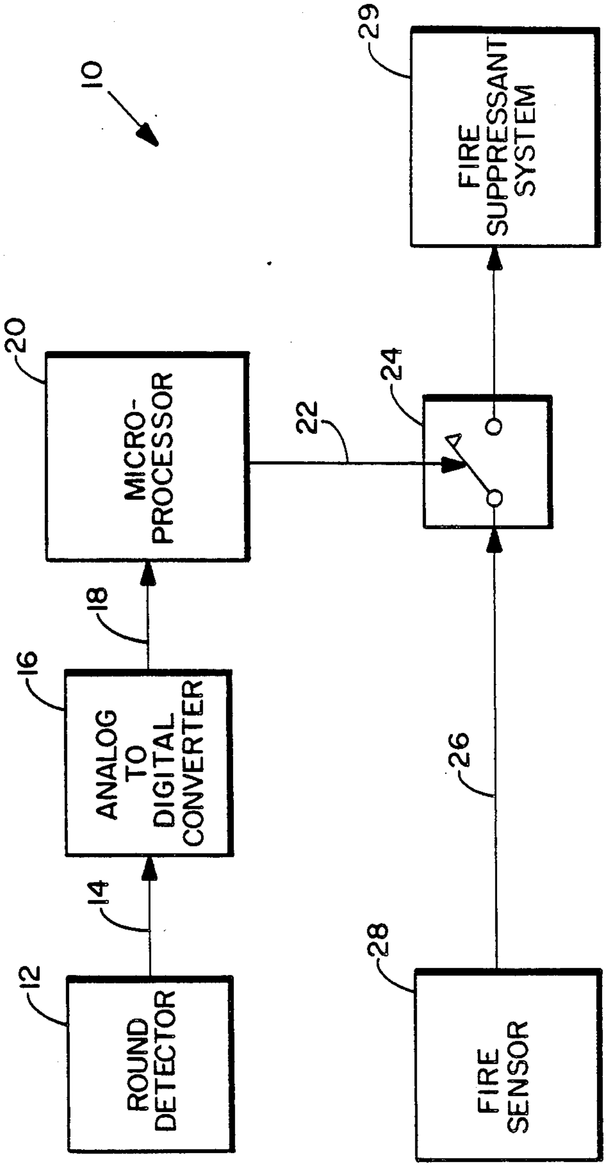
FIG. 1 is a block diagram of an adaptive round discrimination fire sensor system in accordance with the invention.

Referring now to FIG. 1 there is shown in block diagram form a preferred embodiment of an adaptive round discrimination fire sensor system 10. The system 10 comprises a means for detecting the radiation output of a fire initiating device. Such means may be a log detector circuit 12 having a dynamic range in excess of 100 db coupled to a radiation detecting means such as a photodiode having a spectral response between, typically, 0.7 to 1.0 micrometer. Detector 12 has an analog voltage output 14 coupled to the input of an analog-to-digital convertor 16. Analog-to-digital convertor 16 converts, in a well known manner, the voltage output 14 from detector 12 into a digital signal expressive of the voltage magnitude of the signal. This digital representation is expressed as a number of discrete bits which are conveyed by a data bus 18 for input to a control means which may be a data processing means, such as a microprocessor 20. Of course, any suitable data processing means, such as a digital signal processor or even an analog processing unit may be employed. Microprocessor 20 has an inhibit output 22 coupled to a switching means 24. Switching means 24 is further coupled to the output 26 of a fire sensor 28. Thus, microprocessor 20 may open and close switching means 24, thereby connecting or disconnecting the output 26 of fire sensor 28. Switching means 24 may be a semiconductor switch or an electromagnetic relay or any suitable, fast-acting switch which is capable of being controlled by microprocessor 20. The output 26 of fire sensor 28 may be coupled to a suitable fire suppressant means 29 which is operable for suppressing or extinguishing a fire, such as a hydrocarbon fire arising from the explosion of a fuel tank within an armored vehicle. For example, the fire suppressant system 29 may be a bank of $CO_2$ or Freon cylinders coupled to a fast acting activation mechanism. Fire sensor 28 may be sensitive to a specific one or ones of spectral lines associated with the combustion products of a hydrocarbon fire. In accordance with the invention, it is desireable to inhibit the output of fire sensor 28 during certain times, such as immediately after the entry of a HEAT round into an armor plated vehicle. Such inhibition prevents the fire sensor 28 from triggering the fire suppressant means 29 when the fire sensor detects the thermal radiation generated by the HEAT round, even when no hydrocarbon fire has been initiated by the entry of the HEAT round.

In order to perform this valuable function of selectively inhibiting the output of fire sensor 28 after the entry of a HEAT round, the microprocessor 20 is operable for executing a number of software routines. In order to accomplish this function microprocessor 20 may be provided with memory devices and address and data buses (not shown) operable for accessing these memory devices in a manner which is well known to those skilled in the art.

Figure 2A:
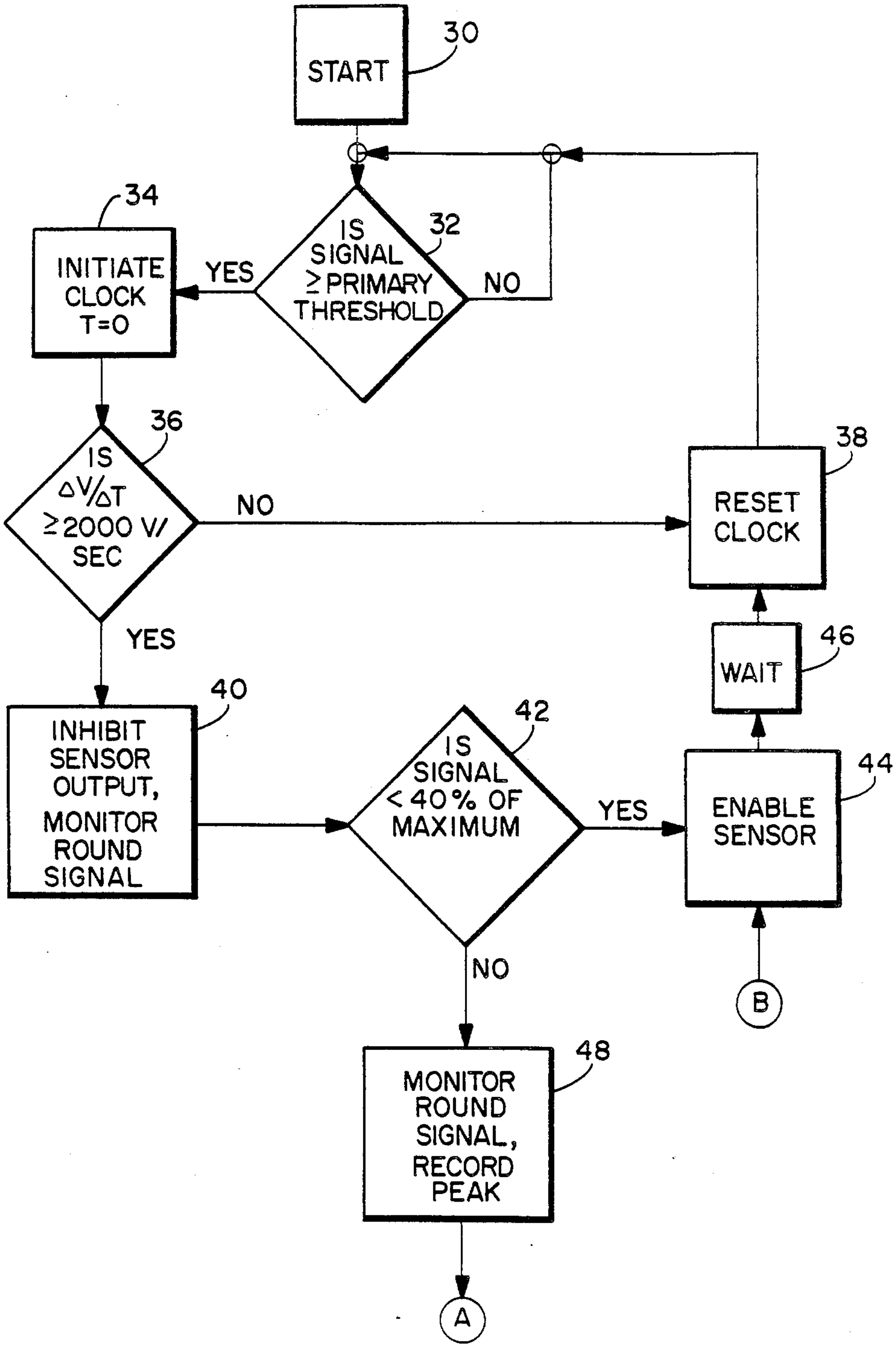
FIGS. 2*a* and 2*b* are a flow chart illustrating certain ones of the software routines executed by the data processing means of the invention.
Figure 2B:
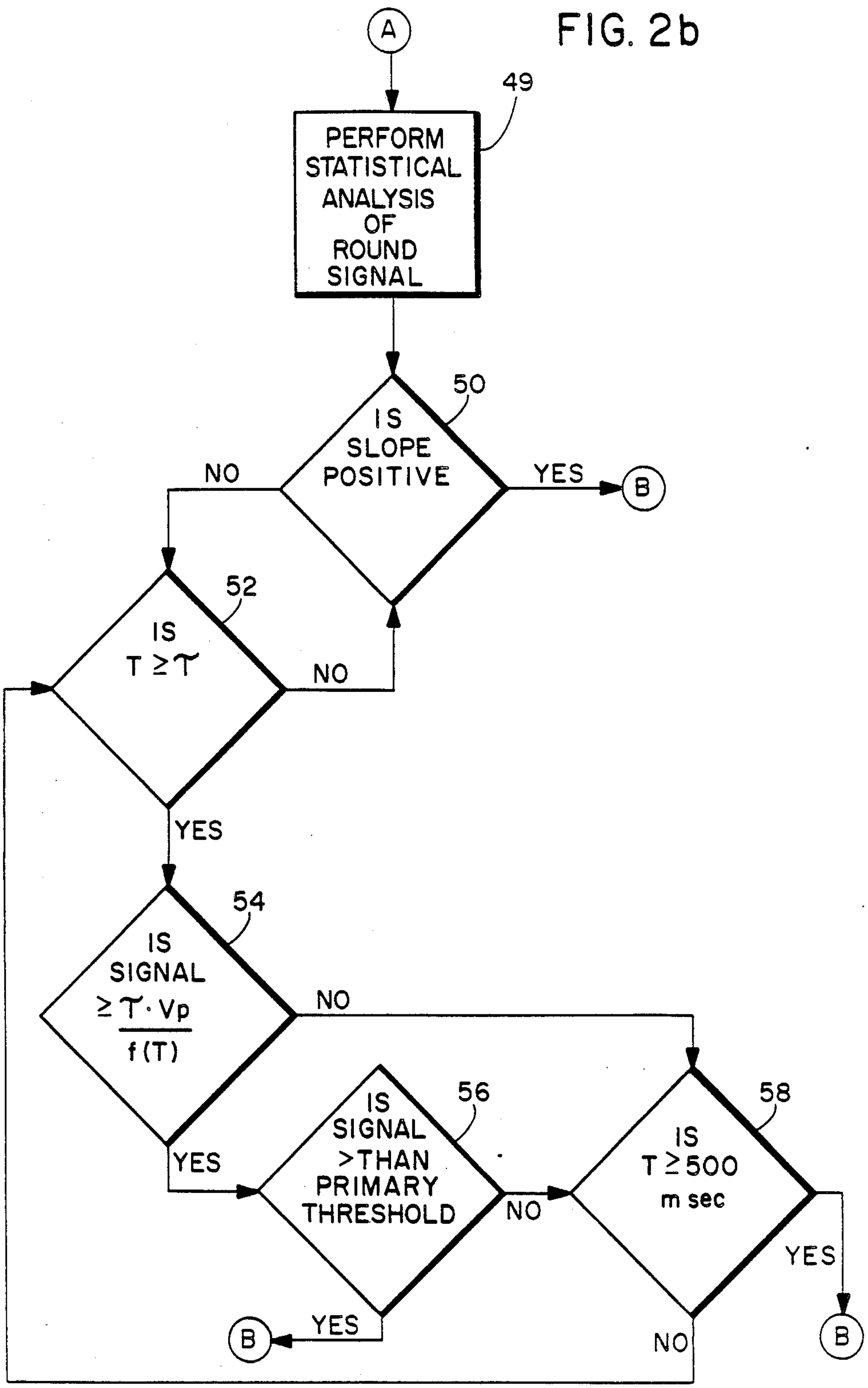

Referring now to FIGS. 2*a* and 2*b* there is shown in flow chart form some of the software routines which are executed by microprocesser 20 in accordance with the invention.

After initial turn on of the system, indicated by the block 30, microprocessor 20 continuously monitors the output of detector 12 as indicated by the block 32. If the magnitude of the output of detector 12 is determined to be above a given threshold value, such as 0.5 volts, the microprocesser 20 initiates an internal timer to a zero count, at block 34. Thereafter the timer increments by, for example, being clocked with a signal having a known frequency. Thus, the value of the timer at any given time after initialization is related to the elapsed time since the detection of the entry of the round.

After a predetermined period of time, typically 300 microseconds, the dV/dT of the round signal is calculated at block 36. A comparison is also made at this time to determine if the calculated dV/dT is equal to or greater than a given threshold value, such as 2000 volts/second. If the dV/dT is found to exceed this threshold value the microprocessor 20 will inhibit the output of the fire sensor at block 40. A dV/dT having this rapid rate of rise has been found to be present generally only if the HEAT round has entered the vehicle without penetrating a fuel cell. If the HEAT round had penetrated a fuel cell, the rate of rise of the dV/dT would have been considerably slower due to the cooling of the round by the fuel or by an engulfing flame. Thus, for a rate of rise of less than 2000 volts/second there is a possibility of the occurrence of a secondary fire and the output of the fire sensor is not inhibited, therefore the microprocessor 20 executes the software routine at block 38 which resets the clock and thereafter returns to the block 32 where the output signal of the detector 12 is continuous monitored.

Figure 3:
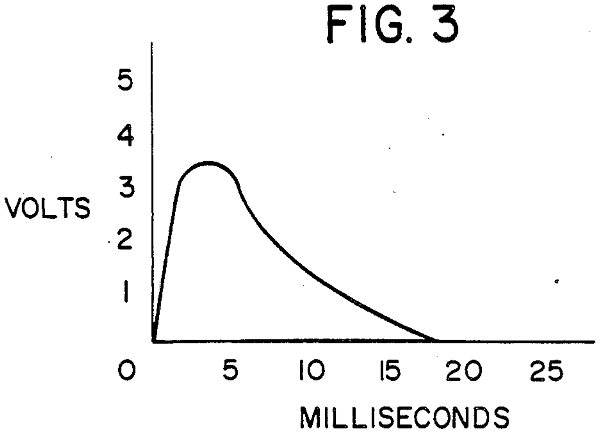
FIGS. 3, 4, 5, 6, 7 and 8 are exemplary graphs showing the output of the round detector in volts versus time for various types of conditions initiated by the entry of a HEAT round into the interior regions of the armored vehicle.

Referring to FIG. 3 there is shown a characteristic thermal profile, or signature, of a HEAT round which did not penetrate a fuel cell upon entry of the vehicle. As can be seen, the primary threshold level is exceeded in less than 100 microseconds, and the dV/dT is well in excess of 2000 volts/second for the next 300 microseconds. The occurrence of a round signature as depicted in FIG. 3 will result in the sensor's output signal being inhibited as in block 40 of FIG. 2.

Figure 4:
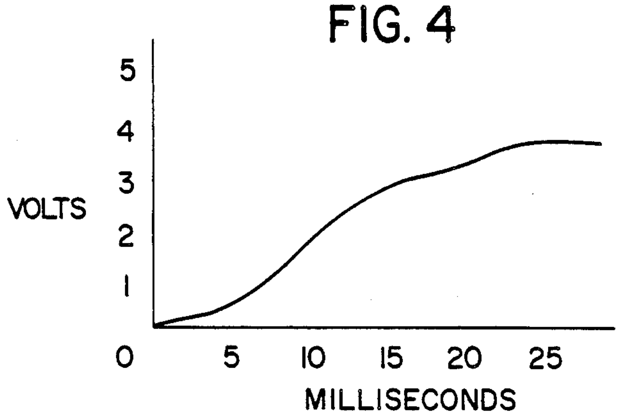

The thermal signature of a heat round which has penetrated a fuel cell upon entry of the vehicle is shown in FIG. 4. In this case the output of the detector circuit does not reach the primary threshold until approximately 4.5 milliseconds after round penetration. This, by itself, would have given the fire sensor ample time to respond, but even after the round signal had exceeded the primary threshold level the sensor would not have been inhibited because of the slow rise of the dV/dT signal.

Figure 5:
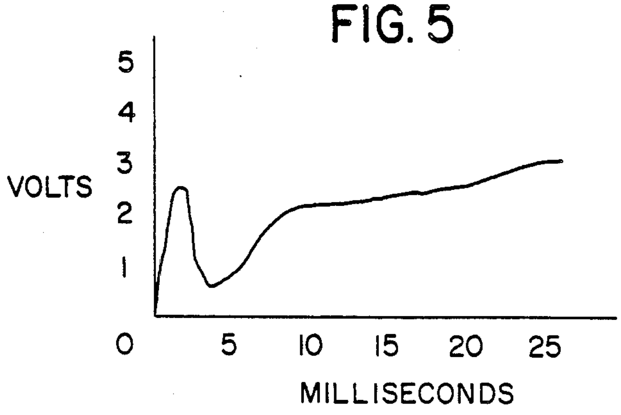

Referring once more to the block 40 of FIG. 2, it can be seen that after the sensor is inhibited, the microprocessor 20 will continue to monitor the round signature and record the highest level reached. At approximately 1.75 milliseconds after the start of the timer at block 34 the reading from the analog-to-digital convertor 16 is compared to the highest reading prior to this time. If at this time the magnitude of the present level is determined to be less than a given secondary threshold value, such as 40% of the highest level recorded, the fire sensor output is enabled at block 44. This enables the sensor output for a round which has entered the vehicle without penetrating a fuel cell, but which did hit a fuel cell or other highly combustible material inside the vehicle. Such an occurrence is depicted in the graph of FIG. 5. At this time (approximately 1.75 milliseconds) if the round had hit fuel or any other combustible material after entry into the vehicle the round would have been cooled by the fuel or by the engulfing flame to a point below 40% of the highest energy level reached, thus the sensor will have been enabled to detect the occurrence of the secondary fire.

If at block 42 the microprocessor 20 determines that the round detector signal level is equal to or greater than 40% of the highest level recorded, program flow enters block 48. At block 48 the microprocessor 20 monitors the round detector output signal for an additional 3.25 milliseconds and records the peak value and the time of the occurrence of the peak value. After this time has lapsed, the microprocessor 20 performs a statistical analysis of the round signal. In order to perform this analysis, microprocessor 20 samples the round signal at approximately 100 microsecond intervals and calculates the mean value of the signal $$\chi = \frac{1}{N} \sum_{i=1}^{N} \chi i$$

and the mean value of the prior 16 residuals of the signal $$D = \frac{1}{16} \sum_{i=1}^{16} \chi i - \chi.$$

At approximately 6.6 milliseconds after the round has entered the vehicle, the signal from the round detector should be decreasing unless a secondary fire has occurred. Thus, the slope of the round signal after this time is utilized to detect the occurrence of a secondary fire. The polarity of the value of the mean of the residuals is utilized to determine the value of the slope.

If after accumulating 16 samples during an interval of 1.6 milliseconds the mean of the residuals is determined to be positive, the output of the fire sensor is enabled. In accordance with the invention, the use of the value of the mean of the residuals allows for the detection of a rapid change in polarity at or near the peak energy level or levels received by the detector. It is at this point where the peak energy level or levels occurs that the chance of a secondary fire is greatest. Thus, the system automatically and continually adjusts the sensitivity in relation to the energy and slope of the round signal. This enables the circuit to respond rapidly to a fast rising signal which is indicative of the presence of an explosion, but does not permit the system to respond to a small increase in signal of a short duration which might be the result of an increase of intensity due to, for example, a hatch opening whereby the round detector is exposed to the sun or to a spray of molten armor in the detector's field of view.

Figure 6:
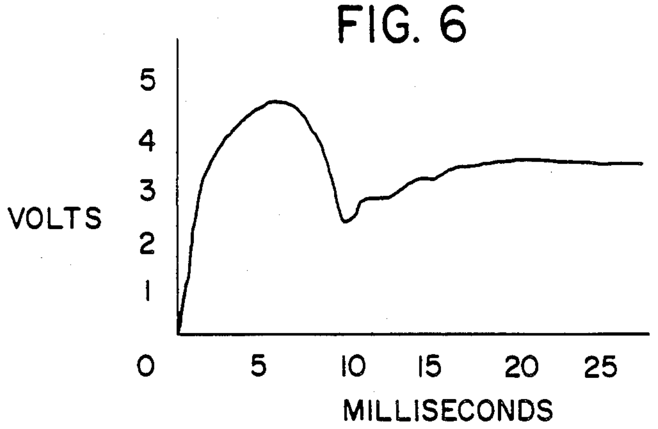
Figure 7:
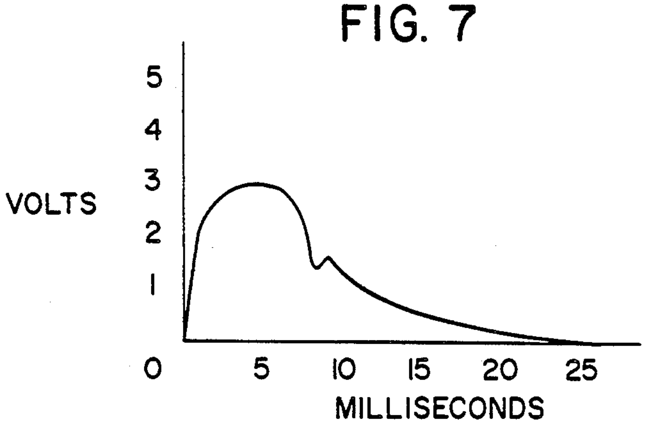

FIG. 6 illustrates a round signature wherein a secondary fire has started and FIG. 7 illustrates a detector signal which has a small secondary positive slope which results from a large number of inert round signatures. Thus, by using the mean of the residuals, the sensor is quickly enabled for the case of FIG. 6 and remains inhibited for the round signature depicted by FIG. 7.

Also, in conjunction with the slope detection of the round signature the magnitude of the received round signature signal must also be in excess of the primary threshold in order to enable the sensor.

At block 52 of FIG. 2 the current timer value is compared to the time at which the peak reading was recorded. After 4 milliseconds have elapsed since the time of peak intensity the round signal is compared to a secondary threshold level at block 54. This secondary threshold level is not a fixed level but, in accordance with the invention, is equal to the time of the peak reading plus 4.0 milliseconds times the value of the peak reading divided by a function of time, or $$S_{ET} = \frac{\tau \cdot V_{PEAK}}{f(T)}$$

where $S_{ET}$ is the secondary energy threshold, $\tau$ is the time of peak energy of the round, $V_{PEAK}$ is the peak amplitude of the round in volts, and T is the current elapsed time relative to the entry of the round.

Figure 8:
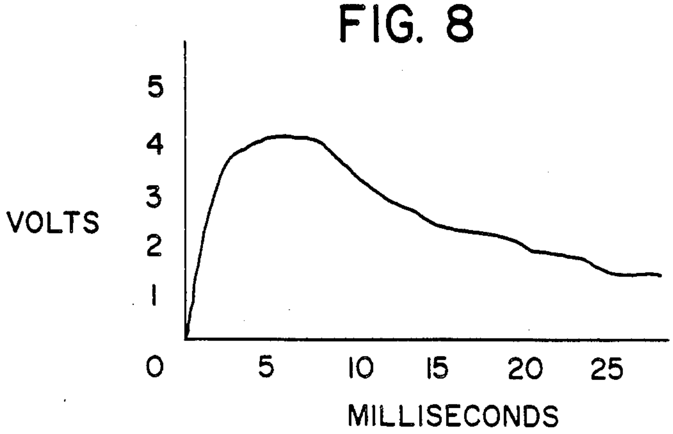

This secondary level has an initial value equal to the value of peak intensity and is thereafter reduced as a function of time until it is equal to the primary threshold level. As indicated at block 56, if the signal is determined to be equal to or greater than the secondary threshold (block 54) the signal is compared to the primary threshold level. If the signal is found to also be greater than the primary threshold the fire sensor output is enabled at block 44. Thus, the sensor is enabled when there is a secondary fire but the round is cooled by the engulfing flame. Such an occurrence is depicted in the graph of FIG. 8. If the signal magnitude is determined to be less than either the secondary or primary threshold levels, blocks 54 and 56 respectively, the fire sensor is not enabled. The microprocessor 20 thereafter continues to compare the signal to the secondary level, the primary level, and check the polarity of the slope (block 50) for 500 milliseconds, at which time the sensor is once more enabled, at block 58.

Based on the foregoing, it can be appreciated that the use of the apparatus and method of the invention overcomes those problems of the prior art which have been previously described. For example, the use of the invention does not require that the fire sensor be disabled because of the saturation of the round detector due to a HEAT round having an excessive thermal energy output. The use of the invention is also advantageous in that the secondary threshold level is not a fixed level, but instead is determined in a dynamic manner based in part upon the elapsed time from the entry of the HEAT round and the peak intensity of the entering HEAT round. Furthermore, the use of the invention does not require any type of special coding or calibration related to the type and/or thickness of the vehicle's armor. Thus, a system constructed in accordance with the apparatus and method of the invention may be advantageously employed in a wide variety of vehicles without requiring any special adaptation for that particular vehicle.

It should be realized that the specific times and threshold values given above are illustrative only, and are not meant to limit the use of the invention to those specific times and threshold values. As can be appreciated, based upon the foregoing a number of modifications to the illustrative embodiment of the invention will become apparent to those skilled in the art. Thus, the invention is not to be limited by the embodiment disclosed herein, the invention is instead to be limited only by the scope of the appended claims.

What is claimed is:

1. An adaptive round discrimination fire sensor system comprising:

means for detecting the occurrence of a fire, said fire detecting means having an output signal for activating a fire suppressant system when a fire is detected, said output signal being switchably coupled to said fire suppressant system by a switching means operable for connecting and disconnecting said output signal to said fire suppressant system;

means for detecting the energy output of a fire initiating device, said device detecting means having an output signal expressive of a magnitude of thermal energy associated with the device; and means for controlling the operation of said switching means, said controlling means being operatively coupled to said device detecting means output signal for determining the magnitude of the device thermal energy, said controlling means further being operatively coupled to said switching means for disconnecting said fire suppressant activation signal when the rate of change of the magnitude of the thermal energy exceeds a given threshold value, said controlling means further being operable, after a given interval of time, for reconnecting said fire suppressant activation signal when the magnitude of the thermal energy has a value which is less than a given percentage of a value of a maximum magnitude attained, during the given interval of time, by the thermal energy.

2. The system as defined in claim 1 wherein said device detecting means comprises a radiation detecting means having a spectral response between 0.7 to 1.0 micrometer and a logarithmic detector circuit coupled to said radiation detecting means, said logarithmic detector circuit having a dynamic range in excess of 100 db and a voltage output expressive of the intensity of the radiation received by said radiation detecting means.

3. The system as defined in claim 2 wherein said controlling means is a data processing means operable for determining from the magnitude of the voltage output the intensity of the radiation received by said radiation detecting means.

4. The system as defined in claim 3 further comprising analog-to-digital conversion means operable for converting said voltage output to a plurality of digital bits for input to said data processing means.

5. The system as defined in claim 1 wherein the given threshold value is 2000 volts per second.

6. The system as defined in claim 1 wherein the given percentage is 40 percent and wherein the given interval of time is 1.75 milliseconds.

7. A method of selectively disabling the operation of a fire suppressant system after the entry of a high energy round into an enclosure having a normally enabled fire suppressant system, comprising the steps of:

monitoring the output of a round detector to determine a time when the output exceeds a given primary threshold value indicative of the energy associated with the entry of a round;

initiating the operation of a timing means for maintaining an elapsed time related to the time of entry of the round;

monitoring the energy of the round for a first predetermined interval of time;

calculating, after the first predetermined interval of time, the rate of increase of the energy associated with the round;

determining if the calculated rate of increase is equal to or greater than a first predetermined value;

disabling the operation of the fire suppressant system if the calculated rate of increase is equal to or greater than the first predetermined value;

monitoring, after disabling the operation of the system, the energy of the round for a second predetermined interval of time;

recording the value of a maximum energy attained by the round during the second predetermined interval of time;

comparing the energy of the round at the end of the second predetermined interval of time to the recorded value;

determining if the energy of the round at the end of the second predetermined interval of time is less than a given percentage of the recorded value; and enabling the operation of the fire suppressant system if the energy is determined to be less than the given percentage.

8. The method of claim 7 wherein if the energy of the round at the end of the second predetermined interval of time is determined to be equal to or greater than the given percentage further comprises the steps of:

monitoring the output of the round detector for a third predetermined interval of time;

recording the value of the maximum energy attained by the round and the time at which the maximum energy was attained during the third predetermined interval;

sampling the output of the round detector at a given sampling interval to obtain a given number of samples thereof;

calculating the mean of the output and the mean of the residuals of the output for the given number of times;

determining the polarity of the slope of the output from the polarity of the mean of the residuals; and determining if the magnitude of the output is equal to or greater than the primary threshold.

9. The method of claim 8 wherein if the slope of the output is determined to be positive and if the magnitude of the output is equal to greater than the primary threshold further comprises the step of:

enabling the operation of the fire suppressant system.

10. The method of claim 8 wherein if the slope of the output is determined to be negative or if the magnitude of the output is determined to be less than the primary threshold further comprises the steps of:

comparing the current time to the recorded time at which the maximum energy was attained; and determining if the current time is equal to or greater than the recorded time plus a fourth predetermined interval of time.

11. The method of claim 10 wherein if the current time is determined to be equal to or greater than the recorded time plus the fourth predetermined interval of time further comprises the steps of:

calculating a secondary energy threshold level;

comparing the current magnitude of the round detector output to the secondary energy threshold level; and determining if the current magnitude of the round detector output is equal to or greater than the calculated secondary threshold level.

12. The method of claim 11 wherein if the current magnitude of round detector output is determined to be equal to or greater than the calculated secondary energy level further comprises the steps of:

determining if the current magnitude of the round detector output is greater than the primary threshold level whereby if the current magnitude is so determined to be greater than the primary threshold level the operation of the fire suppressant system is enabled.

13. The method of claim 7 wherein the fire suppressant system is disabled by disconnecting from the system the output of a fire sensor.

14. The method of claim 7 wherein the steps of monitoring each further comprise the steps of:

detecting with a logarithmic detector circuit having a voltage output an intensity of thermal radiation associated with the round.

15. The method of claim 14 wherein the primary threshold value is approximately 0.5 volts and wherein the first predetermined value is approximately 2000 volts per second.

16. The method of claim 10 wherein the first predetermined interval of time is approximately 300 microseconds, wherein the second predetermined interval of time is approximately 1.75 milliseconds, wherein the third predetermined interval of time is approximately 3.25 milliseconds, and wherein the fourth predetermined interval of time is approximately 4.0 milliseconds.

17. The method of claim 7 wherein the given percentage is approximately 40%.

18. The method of claim 8 wherein the given number of samples is approximately sixteen and wherein the given sampling interval is approximately 100 microseconds.

19. The method of claim 11 wherein the secondary energy threshold level is calculated in accordance with the expression $$S_{ET} = \frac{\tau \cdot V_{PEAK}}{f(T)}$$

where $S_{ET}$ is the secondary energy threshold, $\tau$ is the time of peak energy of the round, $V_{PEAK}$ is the peak amplitude of the round in volts, and T is the current elapsed time relative to the entry of the round.

20. A method of detecting the occurrence of a secondary fire resulting from the entry within an armored vehicle of a high-energy anti-tank (HEAT) round, the vehicle having a normally enabled fire sensor means, comprising the steps of:

determining the time of entry of the HEAT round by detecting a rise in thermal energy above a predetermined primary threshold value;

measuring the rate of rise of thermal energy of the HEAT round;

disabling the operation of the fire sensor means if the measured rate of rise exceeds a predetermined rate of rise;

recursively calculating a secondary thermal energy threshold value which decreases in vlue as a function of time while comparing the current value of thermal energy of the round to each of said calculated secondary threshold values whereby a determination is made as to when the fire sensor means may be once more enabled to detect the occurrence of a secondary fire without inadvertently detecting the thermal energy of the round.

21. The method of claim 20 further comprising the steps of:

calculating the mean and the mean of the residuals of the thermal energy of the round over a predetermined interval of time; and determining in part from the polarity of the slope of the calculated mean of the residuals if the fire sensor means may be once more enabled to detect the occurrence of a secondary fire.

* * * * *